Aug. 17, 1965 A. GERLACH 3,201,603
SWITCHING CIRCUITS
Filed May 23, 1962
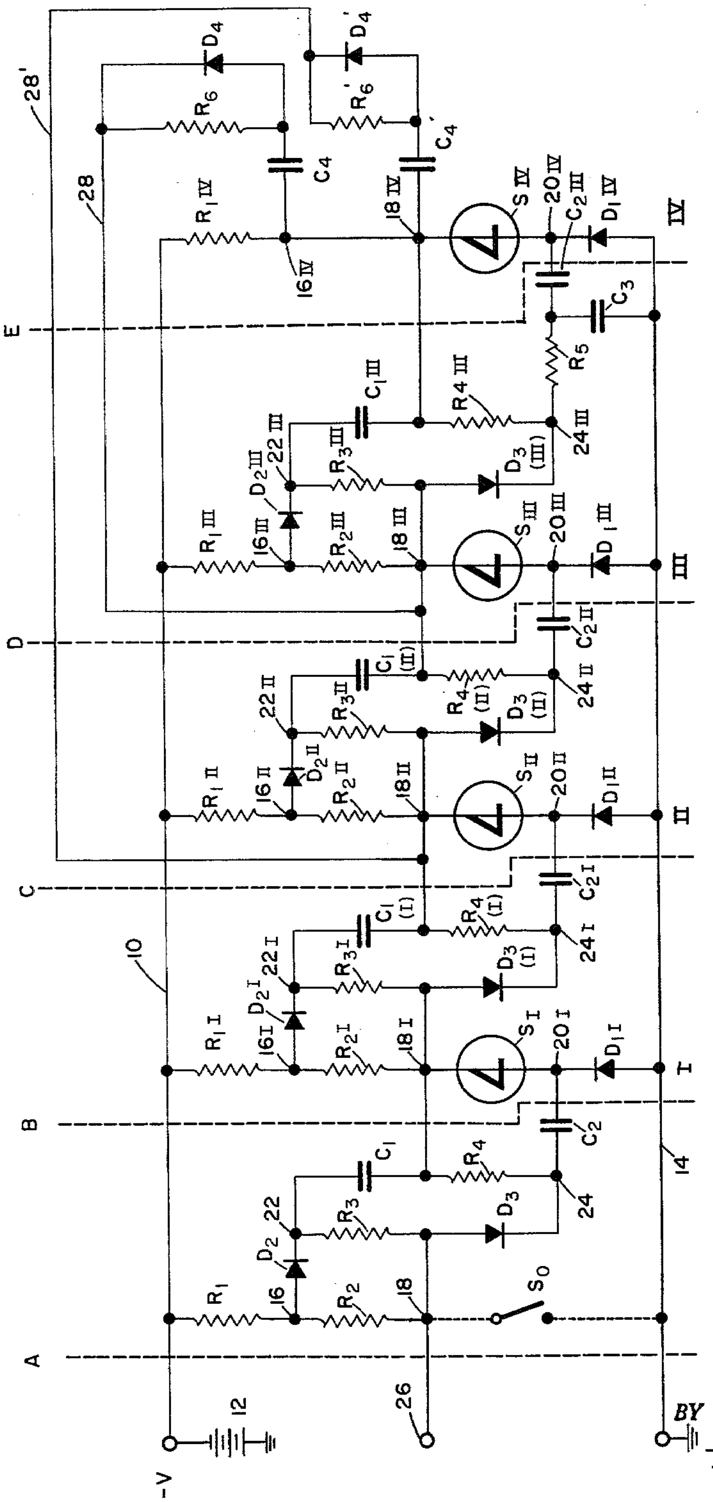
INVENTOR.
ALBRECHT GERLACH
BY
ATTORNEY United States Patent Office 3,201,603

Patented Aug. 17, 1965

3,201,603

SWITCHING CIRCUITS

Albrecht Gerlach, Freiburg im Breisgau, Germany, assignor to Clevite Corporation, a corporation of Ohio Filed May 23, 1962, Ser. No. 197,229
Claims priority, application Germany, May 31, 1961, J 20,006
9 Claims. (Cl. 307—88.5)

This invention relates to circuit arrangements for binary counters or pulse frequency dividers.

As is well-known, present day commercial electronic counters embody decade counters made up of a cascade of binary stages. Each binary stage is capable of assuming two stable conditions and, customarily, four such stages are interconnected and permutated to count input pulses up to 10 and then to re-cycle after each tenth pulse.

The individual binary stages as well as the circuit arrangements by which they are interconnected take a wide variety of forms using diverse switching devices such as electron tubes, relays, transistors and the like.

The fundamental object of the present invention is to provide a switching circuit which is far less complex than known heretofore and in which each binary stage has only a single bistable element.

The switching devices customarily are arranged in pairs, i.e., two to a stage, and interconnected in inverse relation as regards condition of the members of the pair. In other words, if one member of a pair is conductive the other is cut-off. This leads to rather complex circuit configurations embodying relatively large numbers of components.

Stated generally, switching circuits according to the present invention comprise a plurality of bistable circuit elements each having a Thyratron characteristic and distinct stable conditions of conductivity and non-conductivity; and circuit means coupling the bistable elements in a cascade so constructed and arranged that a change in condition in one of the bistable elements causes a change in condition of a succeeding bistable element only when the change in condition in the first bistable element is from non-conductivity to conductivity.

Additional objects of the invention, its advantages, scope and the manner in which it may be practiced will be more readily apparent to persons conversant with the art from the following detailed description of an exemplary embodiment thereof taken in conjunction with the subjoined claims and the annexed drawing in which the single figure is a schematic wiring diagram of a decade counter embodying the present invention.

Before describing the circuit represented by the wiring diagram and its function, it is pointed out that "thyratron characteristic" as used herein is intended to denote the property of a circuit element which enables it, upon the application of a prescribed voltage, to switch abruptly into a low impedance or conductive condition and, upon exceeding a certain critical current, to switch back to a high impedance or non-conductive condition. In the embodiment described hereinbelow by way of example the bistable element having a Thyratron characteristic is a two terminal device, viz., a four layer semiconductor diode (sometimes referred to as a Shockley Diode); it is to be understood, however, that other bistable devices can be used including devices having control electrodes, comparable to the grid of a Thyratron tube, and/or other electrodes.

Referring now to the drawings, there is illustrated schematically the essential circuitry of a decade counter embodying the present invention. Inasmuch as the device consists of a plurality of substantially identical stages connected in cascade, the circuit configuration repeats itself and, accordingly, has been sub-divided by broken lines A, B, C, D and E into four substantially identical segments. Segments A–B, B–C, and C–D, in fact, are precisely identical and segment D–E varies only in one respect as appears hereinbelow.

To make clear the terms of reference, each of the stages proper of the cascade have been designated by Roman numerals, viz., I, II, III and IV, which are intended to designate the stages apart from the inter-stage coupling networks, as will more fully appear as this description proceeds. For the most part, only segment B–C of the circuitry, the distinctive features of segment D–E, and non-repetitive aspects of the diagram will be described in detail. To facilitate correlation between corresponding circuit components of the various segments, a consistent system of reference designation has been employed using like Arabic numerals for like parts with Roman numeral suffixes appropriately applied to indicate the stage in which a particular component occurs.

Stages I, II, III and IV, consist of respective current paths connected in parallel between a source of potential, represented in the diagram by conductor 10 connected to the negative terminal of a battery 12 and a return line, reference or ground potential represented by a grounded conductor 14.

Taking Stage I as an example, the current path consists of a resistive impedance made up of a pair of series-connected resistors $R_1$–I and $R_2$–I connected in series with a bistable four layer diode $S_I$ and a diode rectifier $D_1$–I. Diode $D_1$–I is polarized to offer low impedance to current flow through the path when bistable diode $S_I$ is conducting. In its reverse direction diode $D_1$–I offers high load impedance to pulses provided, in a manner hereinafter described, for switching the condition of the bistable component. Stage I is coupled in cascade to the succeeding stage, II, by means of a coupling network having two branches. One branch consists of a diode rectifier $D_2$–I and capacitor $C_1$–I connecting a point 16–I between resistors $R_1$–I and $R_2$–I of the preceding stage, I, to a point 18–II between the bistable diode S–II and resistors $R_1$–II and $R_2$–II of the succeeding stage, II. The other branch of the coupling network consists of diode $D_3$–I and capacitor $C_2$–I connected in series from a point, 18–I, between the bistable diode $S_I$ and resistive impedance $R_1$–I, $R_2$–I of Stage I and a point, 20–II, between the bistable diode $S_{II}$, and diode rectifier $D_1$–II of Stage II.

The two coupling network branches are interconnected by a resistor $R_3$–I, connecting a point, 22–I, between diode $D_2$–I and capacitor $C_1$–I to point 18–I between the bistable diode and resistive impedance of Stage I, and by an additional resistor $R_4$–I connecting a point, 24–I, between diode $D_3$–I and capacitor $C_2$–I of the second branch to point 18–II between the bistable diode and resistive impedance of Stage II.

Throughout the stages, resistors $R_1$ and $R_2$ preferably are of substantially equal magnitude and $R_3$ of greater magnitude than either $R_1$ or $R_2$ individually for reasons which will appear presently.

Segment A–B of the schematic diagram may be regarded as a hypothetical stage inasmuch as it includes a switch $S_0$ in a position occupied in Stages I to IV by a bistable diode S, and diode rectifier $D_1$. With this exception segment A–B duplicates segment B–C of the diagram, already described.

Switch $S_0$ and the hypothetical stage in which it is located is included to represent a pulse-source and facilitates description of the functioning of the circuit. In its open position, switch $S_0$ represents a bistable element in non-conducting condition; in its closed position switch $S_0$ represents a bistable element in conducting condition. Opening and closing of switch $S_0$ effectively generates input pulses for operating the circuit as would ordinarily be applied at terminal 26.

A description of the operation of the circuit to the extent thus far described will facilitate explanation and understanding of the remainder. As previously mentioned input pulses to terminal 26 can be simlated by opening and closing of switch $S_0$. Assuming that all four stages, I to IV, inclusive, are conductive and switch $S_0$ is closed, upon opening of the switch there is no change in condition in any of the stages. When switch $S_0$ is closed again, bistable diode $S_I$ becomes non-conductive. Upon re-opening of switch $S_0$ there again is no change in the condition of any of the stages but upon re-closing the switch, bistable diode $S_I$ becomes conductive, and at the same time, bistable diode $S_{II}$ becomes non-conductive. Thus, the circuit responds to alternate pulses, specifically, switching of one bistable element from conductive to non-conductive condition does not effect the succeeding bistable element which changes condition only when the preceding bistable element switches from a non-conductive to a conductive state.

The manner in which the circuit carries out this function is as follows. With switch $S_0$ open, the upper plate of capacitor $C_1$ is charged through resistances $R_1$, $R_2$ and $R_3$ from potential source 10, 12 having a magnitude —V. On the lower plate of capacitor $C_1$ is a small negative potential which is equal to the sum of the potential drop through diode rectifier $D_1$–I and bistable diode $S_I$. The left-hand plate of capacitor $C_2$ is charged to the same potential as the lower plate of $C_1$ through resistance $R_4$. On closing switch $S_0$, the potential at point 16 rises rapidly to a less negative potential equal to about ½ the magnitude of the source 12, if $R_1$ and $R_2$ are of about the same magnitude. Thus, what is effectively a positive pulse is generated at point 16 and is transmitted through diode $D_2$ and capacitor $C_1$ to point 18–I. Consequently, point 18–I is temporarily more positive than the potential of return line 14, cutting-off bistable diode $S_I$, i.e., rendering it non-conductive.

Simultaneously, with the positive surge at point 16 the potential at point 18 surges to the magnitude of the source 12. However, this sudden potential increase does not affect the capacitor $C_2$ because diode $D_3$ is biased in the reverse direction by a pre-existing potential equal to the voltage surge at 18.

To illustrate numerically the specific mode of operation of the circuitry thus far described assume that the potential of the return line 14 is zero and the magnitude of source 12 is 18 volts so that conductor 10 will have a potential of —18 volts. Assuming further that all four stages I to IV, inclusive are initially conductive with switch $S_0$ initially closed, upon opening of switch $S_0$ the capacitor $C_1$ becomes charged through resistances $R_1$, $R_2$ and $R_3$ and the potential of its upper plate will become —18 volts. Since Stage I is conductive current flows through diode $D_1$–I and bistable diode $S_I$. The voltage drop across diode $D_1$–I will be approximately 0.7 volt while the voltage drop across bistable diode $S_I$ will be approximately 0.9 volt. (These are usual values for such devices.) The total voltage drop across diode $D_1$–I and bistable diode $S_I$ will, accordingly, be approximately 1.6 volts. Because the potential of the return line 14 is zero, the potential of the lower plate of capacitor $C_1$ will be —1.6 volts, and the net voltage across capacitor $C_1$ will be 18—1.6 or 16.4 volts.

Upon subsequent closing of switch $S_I$ the potential of point 16 becomes equal to ½ the magnitude of source 12 or —9 volts if resistors $R_1$ and $R_2$ are of equal size. Simultaneously, diode $D_2$ becomes conductive. As a result the potential of the upper plate of capacitor $C_1$ also becomes —9 volts. However, as a result of the inherent time lag of the capacitor $C_1$ its charge does not charge for predetermined time after closure of switch $S_0$. Accordingly, the lower plate of capacitor $C_1$ will increase by about the same amount (9 volts) as the potential of the upper plate. Accordingly, the potential of the lower plate of capacitor $C_1$ will momentarily increase from —1.6 volts to +7.4 volts. This potential which appears at terminal 18–I is more positive than that of the return line and extinguishes conduction of bistable diode $S_I$.

The coupling network insures that neither the immediately succeeding bistable element $S_{II}$ nor any of the subsequent stages, are switched non-conductive along with bistable diode $S_I$. This is because the upper plate of capacitor $C_1$–I before cut-off of diode $S_I$, was at approximately zero potential. Consequently, diode $D_2$–I was reversed-biased by the potential surge so that the positive pulse resulting at the connection point 16–I is blocked by the diode and coupling capacitor $C_1$–I thus isolating diode $S_{II}$. The positive pulse passing through the relatively high resistance $R_3$–I is insufficient to cut-off the following bistable diode.

When switch $S_0$ is re-opened, negative pulses originate at points 16 and 18. However, both diodes $D_2$ and $D_3$ are blocked for these pulses and inasmuch as resistance $R_3$ is great in comparison to resistances $R_1$ and $R_2$, the negative pulse after traversing path $R_1$, $R_2$, $R_3$, $C_1$ is inadequate to switch diode $S_I$ to conduction.

Reverting now to the description of the remainder of the circuit illustrated, it is well-known that a cascade of four binary stages is capable of 15 permutations and, therefore, will count up to 15 pulses and then re-cycle. It is also well-known that four binary stages can be arranged to function as a decade counter, re-cycling after ten pulses, by various feedback arrangements.

In accordance with the present invention this is accomplished by a feedback network having two distinct feedback paths of substantially identical configuration, one of which feeds back from the final stage to the input of Stage II and the other from the final stage to the input of Stage III.

Each feedback path consists of respective parallel combinations of a diode rectifier and resistive impedance, $D_4$, $R_6$ and $D_4'$, $R_6'$, each coupled in series with respective capacitors $C_4$, $C_4'$ to Stage IV between bistable diode $S_{IV}$ and resistive impedance $R_4$. A conductor 28 connects the opposite terminals of parallel combination $D_4$, $R_6$ to the input of Stage III, viz., point 20–III bistable diodes $S_{III}$ and resistive impedance $R_1$–III, $R_2$–III; another conductor 28' connects the other terminals of parallel combination $D_4'$ and $R_6'$ to the input of Stage II, viz., point 20–II between bistable diode $S_{II}$ and resistive impedance $R_1$–II, $R_2$–II. In this manner a positive pulse occurring when the final stage, IV, switches from non-conduction to conduction is fed back to and cuts off Stages II and III. As a result, instead of re-cycling from 15 to 0, the circuit is placed in a condition equivalent to binary 6 (i.e., 0110).

In order to avoid coincidence between the normal ignition pulse and the cut-off pulses fed back to Stages II and III, circuit means are provided for delaying the switching of bistable diode $S_{IV}$ to conduction. These means take the form of a resistance $R_5$ connected in series between diode $D_3$–III and capacitors $C_2$–III in the coupling network between Stages III and IV and a capacitor $C_3$ connecting a point between $R_5$ and $C_2$–III to ground potential.

While a decade counter having four binary stages has been described by way of example, it will be appreciated that counters of higher capacity can be constructed by adding additional stages. Thus, for example, a decade counting unit can be constructed having a cycle of $10^3$ by using ten stages with provision made after $2^{10}$ pulses to re-cycle to 0000011000 corresponding to 24.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by United States Letters Patent is:

1. A switching circuit comprising: a plurality of current paths connected in parallel between a potential source and return, each of said current paths containing a bistable circuit element having a Thyratron characteristic and distinct stable conditions of conduction and non-conduction; circuit means coupling said current paths in cascade; and logic circuit means associated with the first said circuit means responsive to the switching of the bistable diode in one of said circuit paths only from a state of non-conduction to a state of conduction for effecting switching of the bistable diode in the next succeeding current path from a state of conduction to a state of non-conduction or from a state of non-conduction to a state of conduction depending upon the initial condition of the diode in said succeeding current path.

2. A switching circuit comprising:
a plurality of current paths connected in parallel between a potential source and return, each of said current paths containing
resistive impedance means,
a bistable four-layer semiconductor diode adapted to be switched between conducting and non-conducting states, and
a rectifier element connected in series in the stated sequence between said potential source and return; and
circuit means coupling said current paths in cascade; and logic circuit means associated with the first said circuit means responsive to the switching of the bistable diode in one of said circuit paths only from a state of non-conduction to a state of conduction for effecting switching of the bistable diode in the next succeeding current path between states of conduction and non-conduction.

3. A switching circuit comprising:
a plurality of current paths connected in parallel between a potential source and return, each of said current paths being substantially identical in configuration and containing
a first and a second resistive impedance,
a bistable four-layer semiconductor diode, and
a diode rectifier connected in series in the staged sequence between said potential source and return,
the polarity of the diode rectifier being such as to present low impedance to current flow through said path when said bistable diode is in a conductive state; and
circuit means coupling said current paths in cascade so that a change in condition of the bistable diode in one of said current paths causes a change in condition of the bistable diode in a succeeding current path only when the change in condition in the bistable diode in said one current path is from nonconductivity to conductivity, each said coupling circuit means including
a first and a second branch each including a series-connected diode rectifier and capacitor,
said first branch connecting a point between said first and second resistive impedances of said one current path to a point between the bistable diode and resistive impedances of the succeeding current path,
said second branch connecting a point between the bistable diode and resistive impedances of said one current path to a point between the bistable diode and diode rectifier of said succeeding current path.

4. A switching circuit according to claim 3 wherein each said coupling circuit means includes:
a resistive impedance connecting a point between the diode rectifier and the capacitor of said first branch and a point between the bistable diode and the resistive impedances of said one current path and
an additional resistive impedance connecting a point between the diode rectifier and capacitor of the second branch of said circuit means to a point between the bistable diode and the resistive impedances of said succeeding current path.

5. A switching circuit comprising:
a plurality of undirectional current paths connected in parallel between a potential source and return, each of said current paths being substantially identical in configuration and containing, connected in series in the stated sequence between the potential source and return;
a pair of resistive impedances of substantially equal magnitude,
a bistable four-layer semiconductor diode having a Thyratron characteristic and distinct stable conditions of conductivity and non-conductivity,
a diode rectifier polarized to present low impedance to current flow through said path when said bistable diode is in conductive condition;
and respective coupling circuit means between each of said current paths and a succeeding current path connecting said paths in cascade, each of said circuit means consisting of
a first branch containing a diode and a capacitor, one terminal of the diode being connected between the resistive impedances of said one current path, said capacitor being connected between the other terminal of said diode rectifier and a point between the bistable diode and the pair of resistive impedances of said succeeding current path, and
a second branch containing a diode rectifier and a capacitor, one terminal of the diode rectifier being connected to a point between the bistable diode and the pair of resistive impedances of said one current path, said capacitor being connected between the other terminal of the diode rectifier and a point between the bistable diode and diode rectifier of said succeeding current path,
a resistive impedance, of greater magnitude than either of said pair of resistive impedances, connecting a point between the diode rectifier and the capacitor of said first branch to a point between the bistable diode and pair of resistive impedances of said one current path, and
an additional resistive impedance connecting a point between the diode rectifier and the capacitor of said second branch to a point between the bistable diode and pair of resistive impedances of said succeeding current path.

6. A decade counting circuit comprising:
a plurality of unidirectional current paths, each constituting a binary counting stage, connected in parallel between a potential source and return, each of said binary stages being substantially identical in configuration and containing, connected in series in the staged sequence between the potential source and return,
resistive impedance means,
a bistable four-layer semiconductor diode having a Thyratron characteristic and distinct stable conditions of conductivity and non-conductivity,
a diode rectifier polarized to present low impedance to current flow through said path when said bistable diode is in conductive condition,
the resistive impedance means in said binary stages consisting, in all but the final stage, of a pair of series-connected resistances of substantially equal magnitude and, in the final stage, of a single resistance of substantially said magnitude;

respective coupling circuit means between each of said binary stages connecting said stages in cascade, each of said coupling circuit means consisting of a first branch containing a diode rectifier and a capacitor, one terminal of the diode being connected between the series-connected resistances of one said binary stages except the final stage, said capacitor being connected between the other terminal of the diode rectifier and a point between the bistable diode and the resistive impedance means of the respective succeeding binary stage, a second branch containing a diode rectifier and a capacitor, one terminal of the diode rectifier being connected to a point between the bistable diode and resistive impedance means of one of said binary stages except the final stage, said capacitor being connected between the other terminal of said diode rectifier and a point between the bistable diode and diode rectifier of the respective succeeding binary stage, a resistive impedance of greater magnitude than said series-connected resistances individually connecting a point between the diode rectifier of said first branch to a point between the bistable diode and resistive impedance means of a respective one of said binary stages, except the final stage, and an additional resistive impedance connecting a point between the diode rectifier and capacitor of said second branch to a point between the bistable diode and resistive impedance means of the respective succeeding binary stage;

and a feedback network coupling the output of said final binary stage to selected preceding binary stages so as to cause the counter to re-cycle after a predetermined number of input pulses less than the total number of possible permutations of the cascade has been applied to the input of the first stage.

7. A decade counting circuit according to claim 6 including means in the coupling circuit between the penultimate and the final binary stage to delay change in condition of the bistable diode in the final stage from nonconducting to conducting.

8. A decade counting circuit according to claim 7 wherein there are four binary stages and said feedback network consists of two individual fedback paths, each consisting of a parallel combination of a diode and resistor connected in series with a capacitor to a point between the bistable diode and resistive impedance means of the fourth binary stage, the other side of the respective diode-resistor parallel combination being connected to respective points between the bistable diode and resistive impedance means of the second and third binary stage.

9. A decade counting circuit according to claim 8 wherein said delay means for retarding change of condition of the bistable diode in said final binary stage from non-conductive to conductive, consists of a resistive impedance connected in series in the second branch of the coupling circuit between said third and fourth binary stage and a capacitor connected in parallel with the diode rectifier in said fourth binary stage between said second branch and the return line.

References Cited by the Examiner

UNITED STATES PATENTS

| | | | |
|---|---|---|---|
| 2,503,662 | 4/50 | Flowers | 328—52 X |
| 2,646,534 | 7/53 | Manley | 328—52.5 X |
| 2,798,983 | 7/57 | Warman | 328—43 X |
| 3,021,450 | 2/62 | Jiu | 328—43 X |
| 3,105,912 | 10/63 | Johnston | 328—43 |

JOHN W. HUCKERT, *Primary Examiner.*

ARTHUR GAUSS, *Examiner.*